US008833240B2

(12) United States Patent
Doglioni Majer (10) Patent No.: US 8,833,240 B2
(45) Date of Patent: Sep. 16, 2014

(54) BEVERAGE CARTRIDGE AND SYSTEM

(75) Inventor: Luca Doglioni Majer, Carate Urio (IT)

(73) Assignee: Tuttoespresso S.p.A., Caronno Pertusella (IT)

( * ) Notice: Subject to any disclaimer, the term of this patent is extended or adjusted under 35 U.S.C. 154(b) by 964 days.

(21) Appl. No.: 11/817,514

(22) PCT Filed: Mar. 22, 2006

(86) PCT No.: PCT/IB2006/000641
§ 371 (c)(1),
(2), (4) Date: Oct. 17, 2007

(87) PCT Pub. No.: WO2006/100570
PCT Pub. Date: Sep. 28, 2006

(65) Prior Publication Data
US 2008/0156196 A1 Jul. 3, 2008

(51) Int. Cl.
*A47J 31/44* (2006.01)
*A47J 31/06* (2006.01)
*B65D 85/804* (2006.01)

(52) U.S. Cl.
CPC ......... *A47J 31/0668* (2013.01); *B65D 85/8043* (2013.01); *A47J 31/4485* (2013.01)
USPC .......................................................... 99/295

(58) Field of Classification Search
USPC ......................................... 99/279, 275, 295
See application file for complete search history.

(56) References Cited

U.S. PATENT DOCUMENTS

| | | | | |
|---|---|---|---|---|
| 3,320,073 | A | * | 5/1967 | Bixby et al. ................... 426/433 |
| 3,878,772 | A | * | 4/1975 | Nordskog ........................ 99/295 |
| 2003/0005826 | A1 | * | 1/2003 | Sargent et al. ................... 99/279 |
| 2003/0005838 | A1 | | 1/2003 | Damme et al. |
| 2003/0172813 | A1 | * | 9/2003 | Schifferle ........................ 99/275 |
| 2005/0045655 | A1 | * | 3/2005 | Santy, Jr. .................... 222/129.1 |
| 2006/0107841 | A1 | * | 5/2006 | Schifferle ........................ 99/279 |
| 2006/0108363 | A1 | * | 5/2006 | Yates, III ....................... 220/23.4 |
| 2008/0264267 | A1 | | 10/2008 | Doglioni Majer |

FOREIGN PATENT DOCUMENTS

| | | |
|---|---|---|
| EP | 1247480 A1 | 10/2002 |
| EP | 1674007 | 6/2006 |
| WO | WO 2004/030500 A1 | 4/2004 |

\* cited by examiner

*Primary Examiner* — Tu Hoang
*Assistant Examiner* — Thien S Tran
(74) *Attorney, Agent, or Firm* — Oblon, Spivak, McClelland, Maier & Neustadt, L.L.P.

(57) ABSTRACT

A method of dispensing a beverage from a beverage dispensing apparatus that includes a cartridge (13) and a beverage collecting unit (1) for dispensing a beverage from said cartridge to a beverage container. The beverage is dispensed from the cartridge to the container along at least two separate dispensers (5,7; 8,9) for dispensing a beverage from a cartridge.

16 Claims, 6 Drawing Sheets

BEVERAGE CARTRIDGE AND SYSTEM

The present invention relates to the field of beverage cartridges and systems for preparing hot and cold drinks. more particularly, this invention relates to beverage systems using disposable cartridges containing fresh, liquid, soluble or ground products intended for the preparation of beverages such as coffee, tea, cappuccino or the like in dispensing machines. The invention also concerns a method for dispensing said beverages.

DESCRIPTION OF THE KNOWN ART

In the past years, beverage dispensing machines—the so-called "closed systems"—have become very popular. These machines provide a practical and user-friendly beverage dispensing system that makes use of dedicated and disposable containers of edible products, usually called pods, capsules or cartridges, that allow the user to obtain a consistent quality, clean and skill-free preparation cycle through a portion-control, relatively low-cost, low-maintenance dispensing machines.

EP-A-0125215, in the name of the present applicant Tuttoespresso, is one of the first disclosures of the above mentioned dispensing systems. In this hot drink dispensing machine, pre-filled containers of different sizes can be used to dispense a variety of drinks ranging from brewed American coffee to espresso and chocolate flavoured drinks. This result is obtained by means of a water supply head, and closing means to seal the brewing/mixing chamber provided by the two parts composing the cartridge body, said closing means being adapted to fit differently sized containers.

This initial cartridge and system evolved in the years to more complex ones, in order to provide better quality drinks.

The object of the search for improvement in these years has concerned the way of opening the cartridge, the way of obtaining better froth, and a greater flexibility.

WO9525457 is directed to a system making use of sealed cartridges that are opened by a filtering head made of plastic cuspids. Said cartridge has a bottom wall facing the filter wall projections when the cartridge is placed in the cartridge holder, when the bottom wall is deformed by the pressure of the liquid fed to the cartridge and, as a result, is pierced by the filter wall projections. The filtering-opening head represents the major drawback of this system, because of the reduced size of the slits through which the beverage is directed when going through the filtering head into the user's container.

U.S. Pat. No. 5,656,316 concerns a disposable cartridge for beverages whose upper wall can be perforated by a conduct for feeding of pressurized water inside the cartridge. A collector of the beverage is located under the cartridge bottom wall, which breaks upon deformation under an increase in the internal pressure of the cartridge, thus allowing for the obtained beverage to exit. In this embodiment means for opening the cartridge are provided on the beverage dispensing machine, having the disadvantage of contacting the beverage, with resulting cross-contamination problems on the plunger when cartridges for different beverages are utilized.

WO02/076270 in the name of Tuttoespresso describes a unit system for the preparation of a beverage from a soluble product contained in a disposable cartridge that is comprising a collecting device with a housing means designed to contain the cartridge, wherein at least one throttling arrangement is provided to provide a laminar flow of the beverage leaving the cartridge. Although this system ensures superior mixing quality of the beverage, it is not very flexible.

Further work was done in the past years to obtain a flexible dispensing system providing high quality, multi-ingredient beverages.

For instance, European patent application EP-A-1440910 in the name of Kraft Foods, concerns a disposable cartridge for the preparation of beverages starting from a food product containing liquid or powder milk, or containing roasted or ground coffee, tea, etc. The system disclosed in this document allows to obtain an up-to-date menu of drinks comprising not only basic single-ingredient beverages such as fresh-leaf tea or coffee, but also beverage recipes comprising for instance dairy milk or concentrated fruit juices. However, the use of two separate cartridges is requested to make e.g. a latte macchiato: a first cartridge for the coffee and a second cartridge for the liquid milk; this is a clear drawback for the system because of the relevant increase in cost of the beverage and complexity of the dispensing method and machine.

Another application from the same applicant (Kraft Foods), US20040182251, discloses a cartridge that is assembled from several members. The assembled cartridge has a spout for dispensing and directing the beverage into a beverage container and can contain more than one beverage ingredient. The cartridge is extremely complex and, being obtained from several different members, is expensive to manufacture.

Therefore, there is the need for an improved system, i.e. for an apparatus—said apparatus including a cartridge and a beverage collecting element—and a method, for dispensing beverages, particularly from two or more ingredients, in an easy, reliable, cost-effective way.

It is an object of the present invention to solve the about mentioned problem and provide an improved beverage dispensing apparatus and method that can give excellent beverage from one or more ingredients.

Accordingly, the present invention provides a beverage dispensing apparatus, including a cartridge and a beverage collecting unit for dispensing a beverage from said cartridge to a beverage container, characterized in that said beverage collecting unit comprises at least two separate dispensing means for dispensing a beverage from a single cartridge. The apparatus also comprises water and/or steam inlet means, i.e. means to feed water and/or steam to the cartridge in order to obtain a beverage upon mixing said water or steam or both of them with the beverage ingredients in the cartridge.

In other words, the invention makes use of two or more separate and different dispensing ducts that define two or more separate and different paths along which the dispensed beverage or ingredient flows from the cartridge to the cup or other beverage container.

The present invention also provides a method of dispensing a beverage from a beverage dispensing apparatus, said apparatus including a cartridge and a beverage collecting unit for dispensing a beverage from said cartridge to a beverage container, characterized in that said beverage is dispensed from said cartridge to said container along at least two separate dispensing means for dispensing a beverage from a single cartridge.

According to a preferred embodiment, the two dispensing means comprise two ducts provided in said collecting unit, each duct extending from one or more outlet openings of the cartridge to a position suitable for delivering said beverage or beverage ingredient to said beverage container. The inlet of each duct is separate from the inlets of the other ducts so as to be able to flow only one beverage or beverage component to the cup. In other words, the ducts according to the invention are dedicated to one beverage or beverage ingredient (e.g. coffee and milk) only.

According to a further preferred embodiment, said cartridge comprises at least two separate volumes to contain different ingredients or beverages, each ingredient or beverage being dispensed from the cartridge to the final beverage container through a different dispensing duct.

According to another aspect of the invention, the beverage collecting unit has two circular collecting chambers coaxially arranged one inside the other on the same plane or on different planes, each chamber having at least one outlet to one of said dispensing means. In a preferred embodiment, the beverage collecting unit having two inlets and two outlets is used with a cartridge having separate chambers with separate water inlets and beverage (or beverage ingredients) outlets; the water/steam inlet means, i.e. the means to feed water/steam to the cartridge, of the dispensing machine also have separate outlets to feed water at different temperatures or even steam. In this embodiment two (or more) separate flow paths are defined from the upper part (water/steam feeding outlets) of the system to the bottom part, i.e. to the end of the dispensing means of the beverage collecting unit.

Preferably, one of the dispensing ducts of the beverage collecting unit has a smaller diameter than the diameter of the other (or others) ducts. Besides different diameters, said ducts can also have different shapes, configuration and internal finishing to maximize, in combination with different cartridges, the beverage cup quality.

The beverage dispensing system according to the present invention results in a number of advantages.

By making use of separate dispensing means, i.e. of two or more separate and different dispensing ducts that define two or more flow paths for the beverage, a very simple cartridge can be used while maintaining very good beverage characteristics. Because the different ingredients flow through different dispensing ducts, separate crème (e.g. froth/foam), textures and colours of the beverage ingredients are maintained until the final cup where the beverage is collected, thus resulting in high quality drinks. For instance, in the case of a "latte macchiato" the milk and the coffee (i.e. the two beverage ingredients) are dispensed from two different chambers or spaces of the cartridge and flow separately through the beverage collecting unit into a cup. By dispensing the two ingredients in two different times (e.g milk first and coffee later) a final beverage very close, when not superiorly consistent, to the same beverage obtained manually at a bar can be obtained.

Another advantage is that there is no cross contamination, i.e. flavour crossover, of two separate drinks bearing different flavours; this is also important because it solves the additional problem of avoiding possibly allergenic products (e.g. milk proteins) to contaminate later dispensed drinks supposedly without allergenic products.

More generally, the invention system (water feeding means, cartridge, beverage collecting unit and dispensing method) makes it possible to obtain from the same dispensing machine, using cartridges of different ingredients, different preparations so that both fresh and soluble ingredients as well as liquid concentrates and dairy products can be dispensed using different brewing or mixing methods and finally flowing through separate outflow paths. As an example, water or steam is fed to a chamber containing milk at different temperature and pressure from the water fed to the chamber containing ground coffee, the two ingredients will mix only in the cup, thus avoiding the milk (or other dairy product) to be improperly treated.

Further characteristics and advantages of the present invention will be more evident from the following description, given as a non limiting example with reference to the attached schematic drawings, wherein.

For the scope of the present invention, the wording "ingredient" is encompassing any edible substance that mixed with water or used as such may be part or the whole of a beverage for human consumption. For instance, but without restricting the application scope to the hereinafter mentioned ones, the present invention may be used with cartridges filled with ground coffee, leaf tea, herbal remedies, dairy or non-dairy soluble or liquid products such as concentrated creamer, UHT milk cream, granulated milk, or with soluble products such as chocolate or pre-mixed cappuccino or lemon tea powders as well as concentrated fruit juices, artificial or natural flavouring agents, dressing powders such as cinnamon and similar products.

As previously mentioned, beverage ingredients can also encompass a beverage, if this beverage will be combined with another ingredient to give the final beverage; as an example, a brewed coffee, when consumed directly is a beverage and when used with e.g. a creamer, can be defined as "beverage ingredient".

With reference to FIGS. 1-4, a beverage collecting unit 1 according to the invention is shown. This unit is provided, in a way know in the art, with an upper part 2 that interacts with the cartridge, e.g. the unit has a plunger 4, to house and/or open said cartridge. The collecting unit 1 also comprises a lower part 3 that comprises a duct or similar means to dispense the beverage, or beverage components, to the beverage container such as a cup or further beverage collecting means (not shown).

According to the invention, the beverage collecting unit 1 comprises at least two separate dispensing means for dispensing a beverage from one or more cartridges.

In the shown embodiment, said dispensing means comprise two circular collecting chambers 5 and 8 coaxially arranged one inside the other, and two dispensing ducts 7 and 9, respectively, to direct the beverage (ingredients) to a cup. Other arrangements of the collecting chambers (such as side-by-side) are possible. The two dispensing means, i.e. the collecting chambers and the connected ducts, are extending from one or more outlet openings of the cartridge to a position suitable for delivering said beverage or beverage part to said beverage container. The inlet of each duct or of each collecting chamber, is separate from the inlets of the other ducts so as to be able to flow only one beverage or beverage component to the cup. In other words, the dispensing means according to the invention are dedicated to feed one beverage or beverage component only from the cartridge to the final beverage container (e.g. the cup).

In the embodiment disclosed by the figures, embodiment here shown only as an example, the outer circular chamber 5 has a slanted bottom, i.e. a bottom wall that is lining on a plane that is angled to the horizontal plane of unit 1. Bottom 10 directs the collected beverage (ingredient) to an outlet hole 6 that is connected to dispensing duct 7.

Chamber 8 has a frusto-conical bottom 11 that forms a funnel ending in outlet 12 and dispensing duct 9.

Preferably, one of the dispensing ducts, 7, of beverage collecting unit 1 has a smaller diameter than the diameter of the other (or others) duct 9. The smaller duct 7 is advantageously used to dispense coffee to the beverage container: It was surprisingly found that there is a significant improvement in the froth texture of the coffee dispensed through this reduced-diameter duct, with respect to the standard ducts. As previously mentioned, the two ducts can have not only different diameter, but also different shape, internal finishing or they may even be made of different materials.

The bigger duct 9 is used for dispensing, i.e. directing, milk or dairy products, or other ingredients such as e.g. a soup, to the cup. In view of the products to be dispensed though this duct, the duct material will be as smooth as possible to avoid building up of residues; a material including antibacterial agents suitable for food treating can be used. The smaller duct is preferably used for the coffee; as mentioned, shapes different from the straight tube shown in the drawings can be used to maximize the texture and the cup quality of the beverage.

It is worth emphasizing that the beverage collecting unit 1 of the invention can be used with cartridges containing one or more than one beverage ingredients; in fact, the collecting units can be used with traditional cartridges or with the invention cartridges.

FIGS. 5-10 show a preferred embodiment of a cartridge to be used with the collecting unit 1 above disclosed.

Figure 1:
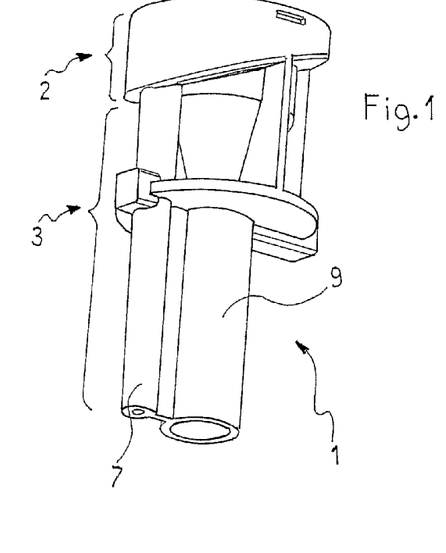
FIG. 1 and FIG. 2 are perspective views of the beverage collecting element according to the invention, from the bottom and from the top, respectively.
Figure 2:
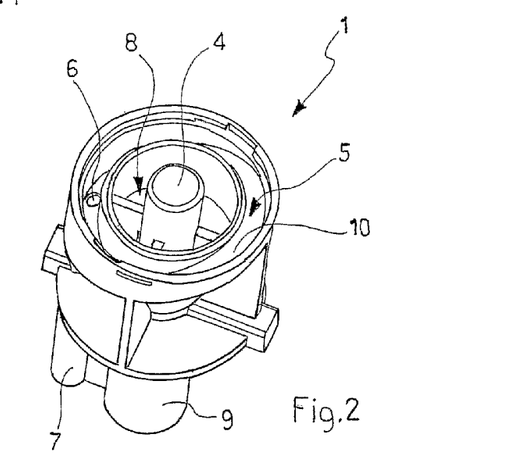
Figure 3:
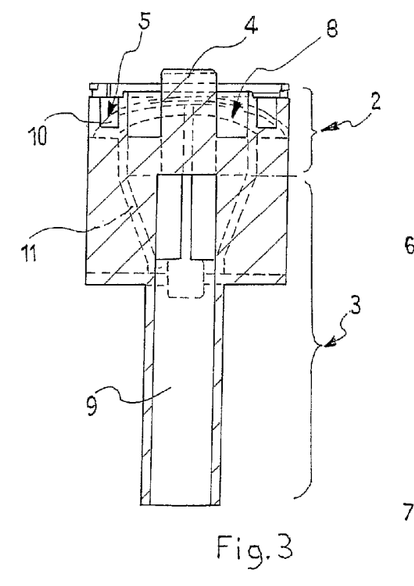
FIG. 3 and FIG. 4 are two views along different longitudinal section planes of the element of FIGS. 1 and 2.
Figure 4:
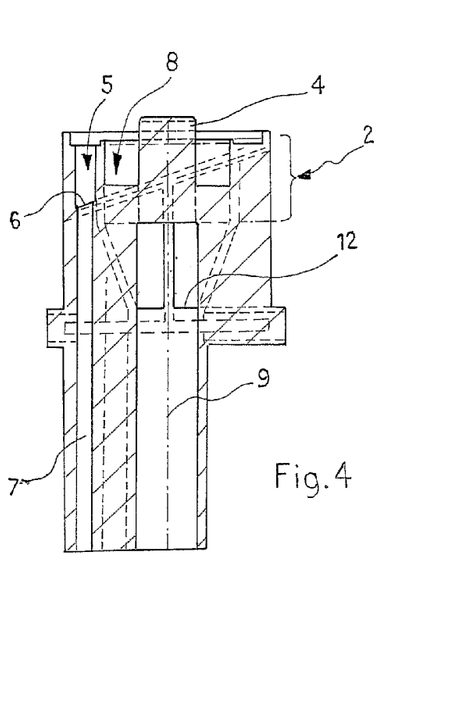
Figure 5:
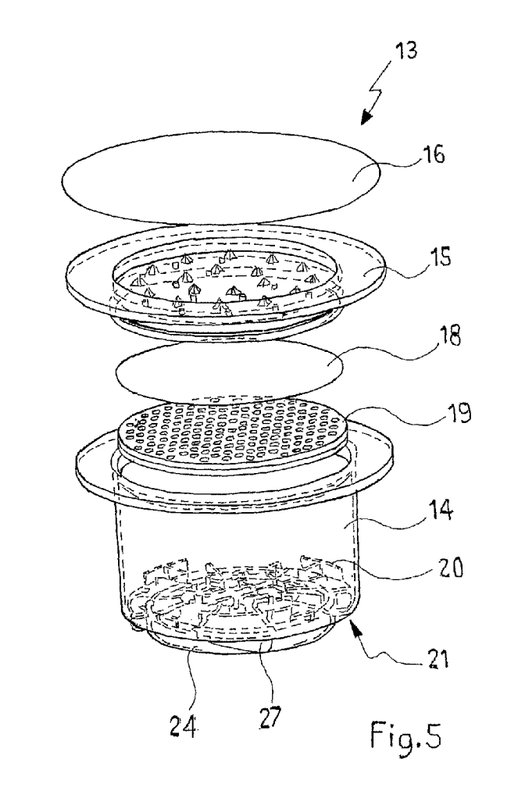
FIG. 5 is an exploded view of a cartridge according to the present invention.

Cartridge 13 comprises a lower portion 14 and a top portion 15 that are secured together by any suitable way, e.g. glued, thermosoldered etcetera, to provide a container for the beverage ingredient. Top portion 15 is shown provided with a sealing foil 16 that will be punctured by cuspids 17, i.e. by a plurality of puncturing means, upon feeding water from a pump. This embodiment is disclosed in co-pending application n. PCT/IT2004/000503 filed Sep. 17, 2004 in the name of Tuttoespresso, but the invention scope is not limited to this embodiment; other known or obvious embodiments, e.g. such as the presence of holes or the use of puncturing means not carried by the cartridge, are also possibly used in the present invention.

Figures 11, 12, 13:
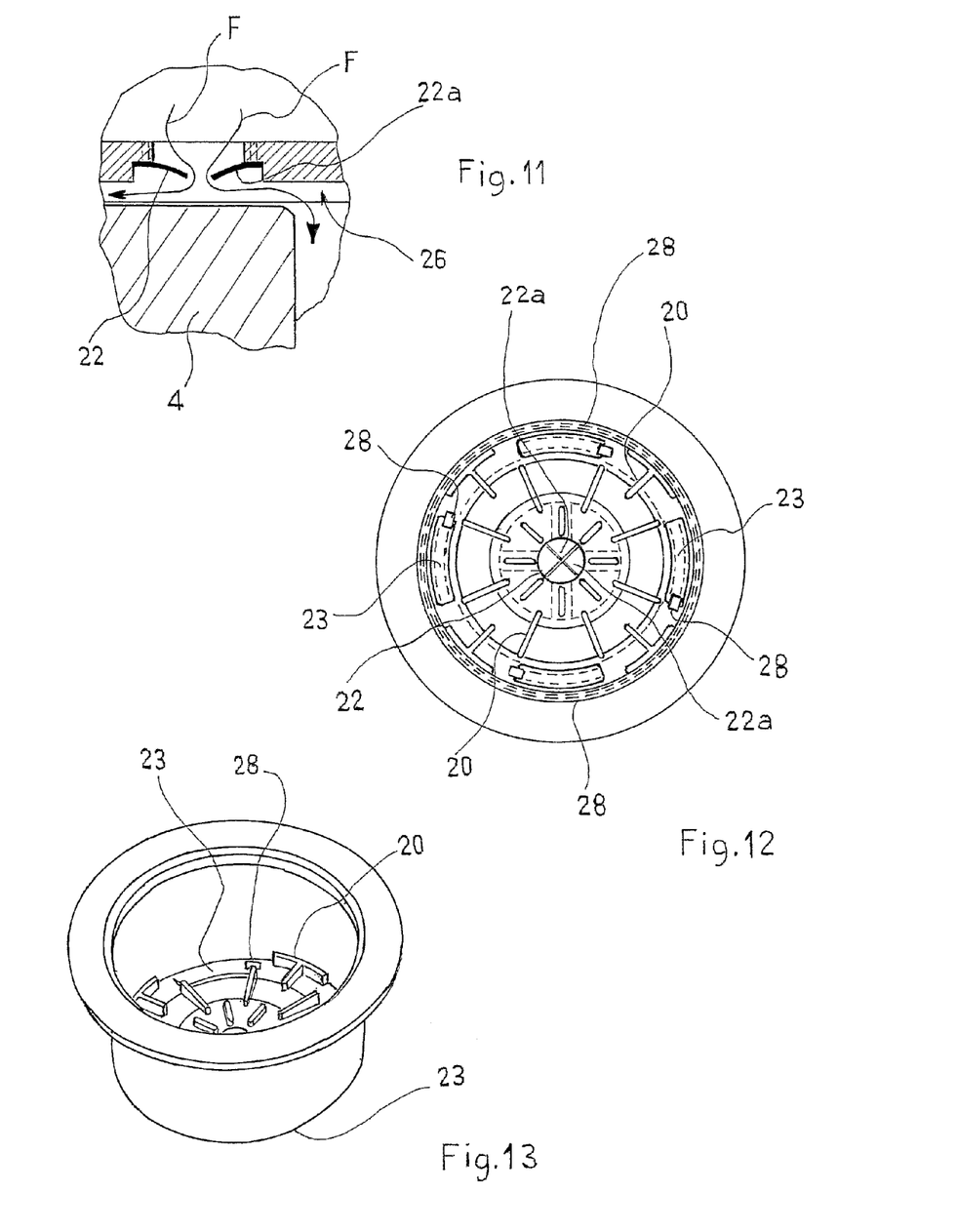
FIG. 11 is a sectional view of a detail of the cartridge of FIG. 5.
FIG. 12 is a top view of the lower part of the cartridge of FIG. 5.
FIG. 13 is a perspective view of the cartridge bottom part.

FIG. 5 also shows a filter 18 and a filter supporting element 19 that are inserted into the lower portion 14 of the cartridge and are positioned on a plurality of ridges 20 projecting from the bottom wall 21 of cartridge 13; these ridges are better detailed in FIG. 12 and FIG. 13.

According to the present invention the outlet openings for the beverage components in the cartridge are connected with the corresponding dispensing means, only, of the collecting unit, so as to provide with the collecting unit a means of delivering in a separate way, i.e. along different paths, different components of a beverage to a cup or other beverage container.

To this end, in the shown embodiment, the bottom wall 21 is provided (FIG. 6) with a short circular wall 24 that extends substantially vertically to bottom wall 21, externally to the same, and divides the external side of bottom wall 21 in two separate areas for dispensing separate beverage (ingredients).

Figure 6:
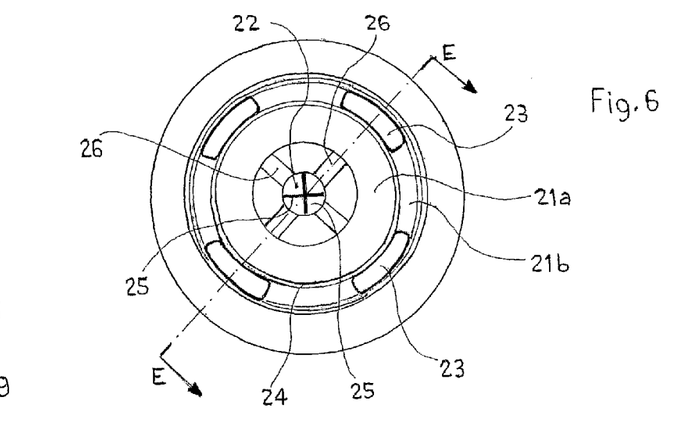
FIG. 6 is a bottom view of the cartridge of FIG. 5.
Figure 7:
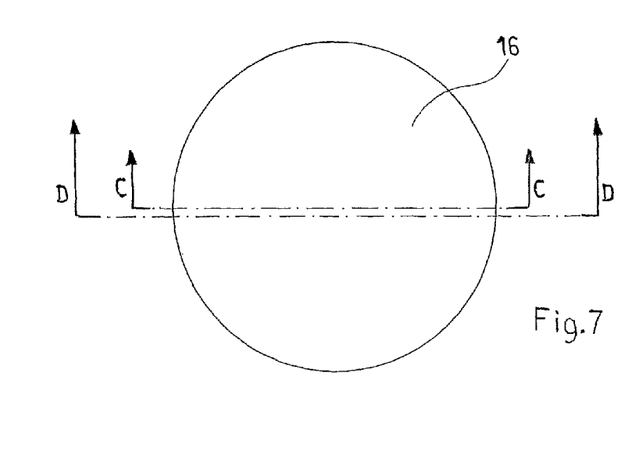
FIG. 7 is a top view of FIG. 5 cartridge.
Figure 8:
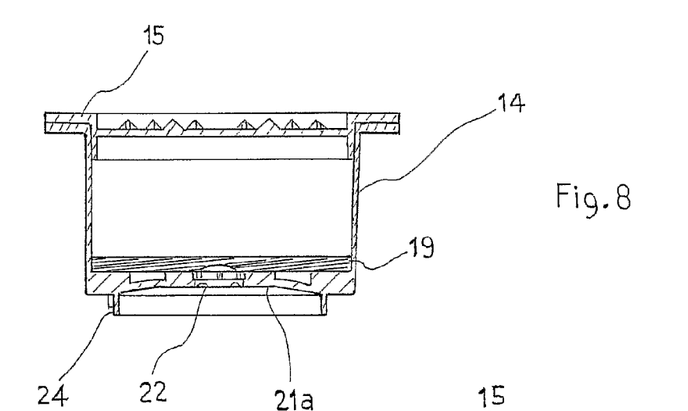
FIGS. 8-10 are sectional views of the cartridge of FIGS. 6 and 7 along planes D-D, C-C, E-E.
Figure 9:
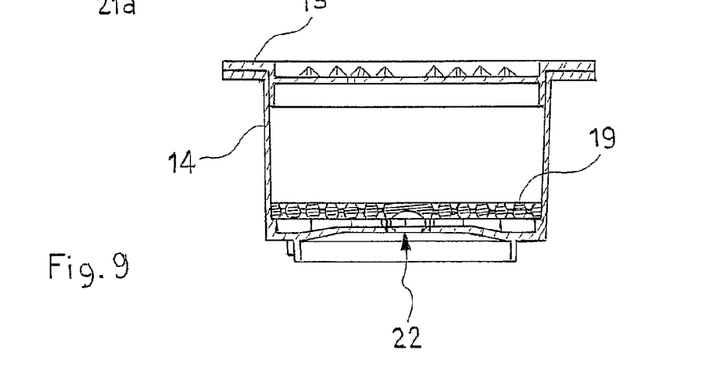
Figure 10:
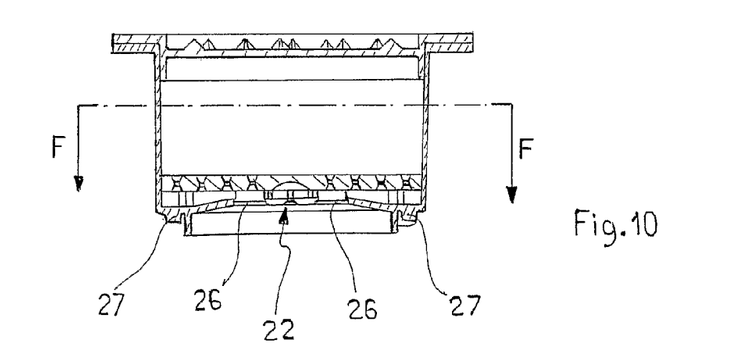

The outer part of wall 21 is provided with at least one, preferably with a plurality of dispensing outlets 23. Internally to wall 24 a central outlet 22 is provided, to let the beverage flow from the cartridge to the collecting unit 1.

More particularly, the cartridge has a main, centrally located, opening portion 22 that comprises two crossed fracture lines 25 that form four wing portions 22a. The wing portions 22a can be flexed to create an outlet opening.

The main opening 22 can be opened by plunger 4 that pushes the opening wing portions inside the cartridge, or can be opened by the action of the pressurized water fed into cartridge 13, that pushes the opening wing portions 22a towards the outside of the cartridge. In the first embodiment the plunger has a smaller diameter than the diameter of portion 22 of bottom wall 21 and is inserted into the portion 22; in the latter embodiment the collecting unit has a plunger head that is larger than the diameter of opening 22 and, as shown in FIGS. 8-11, the plunger head is in contact with the portion 21a defined by wall 24 of the external side of bottom wall 21.

In order to let the beverage flow from the opening 22 into chamber 8 of collecting unit 1, a plurality of channels, or canals, 26 are provided in bottom wall portion 21a, externally to it. Because the plunger is contacting the surface of wall portion 21a, a big enough space is formed between plunger 4 head and opening element 22 to have the wing portions 22a of opening 22 flex outwardly. Moreover, canals 26 provide room for the beverage to flow and reach chamber 8 and dispensing duct 9. If the space between plunger head 4 and wings 22a is small enough and if the wings 22a of opening portion 22 are long enough, the tips of the wings will contact the plunger head and the exit area for the beverage will be reduced; vice versa, if the space, i.e. the distance, is big enough, the exit area for the beverage will be greater. By acting on these parameters, i.e. by acting on the throttling that is formed at the exit of the cartridge, the beverage quality can be maximized.

FIG. 11 shows schematically the position of the plunger 4 and the bottom wall of the cartridge 13 during the beverage dispensing step: in this step the wing portions of the opening 22 are pushed outside, i.e. towards the plunger 4, by the force of the pressurized beverage, the beverage can thus flow as shown by arrows F out from the cartridge, along the plunger 4 head in canals 26 and down along the collecting unit to the cup (not shown).

Figure 15:
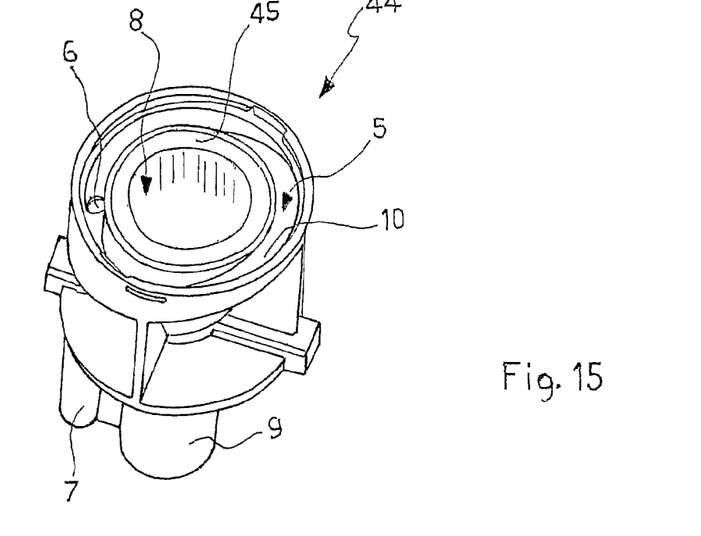
FIGS. 15 and 16 are perspective and sectional views of another embodiment of a collecting unit according to the invention.
Figure 16:
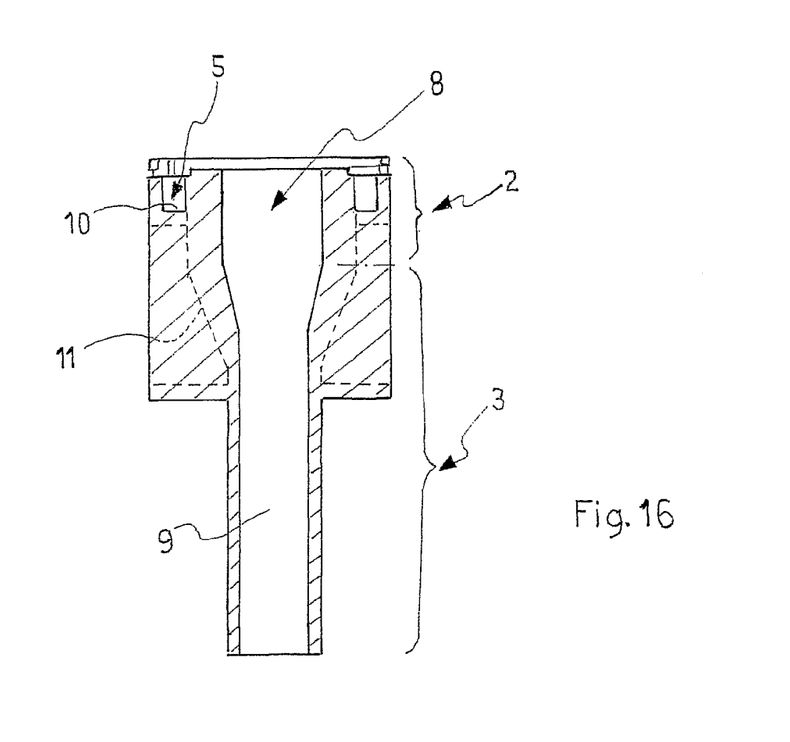

In FIGS. 15 and 16 another embodiment of collecting unit 44 is shown. In this embodiment chamber 8 is defined by a wall 45 that will insist on portion 21a of bottom wall 21 of the cartridge: the wings 22a will open directly inside chamber 8.

In order to open the one or more outlet openings 23, these portions of the bottom wall 21b (i.e. the portion of wall 21 that is external to wall 24) are provided with projecting elements 27 that, in the preferred embodiment shown, are integral with the opening portions 23 and are formed by a wedge-shaped part of said opening portions. In other words, the bottom wall 21b, in correspondence of the portions 23 defined by fracture lines 28, extends externally to provide projecting, wedge-shaped, portions 27. To avoid portions 23 to fall into the beverage collecting unit, a retaining means in the form of hinges 28 is provided to secure said portions to the bottom wall of the capsule.

Similarly to the previously discussed ways of operating opening 22, in this case, too, opening portions 23 can be opened by a plunger-like portion of the collecting unit 1 or by the build-up of internal pressure within the cartridge. The shown embodiment makes use of the latter solution, i.e. of the use of the build-up of internal pressure, and the portions 23 will open outwardly upon feeding pressurized water to the cartridge.

Figure 14:
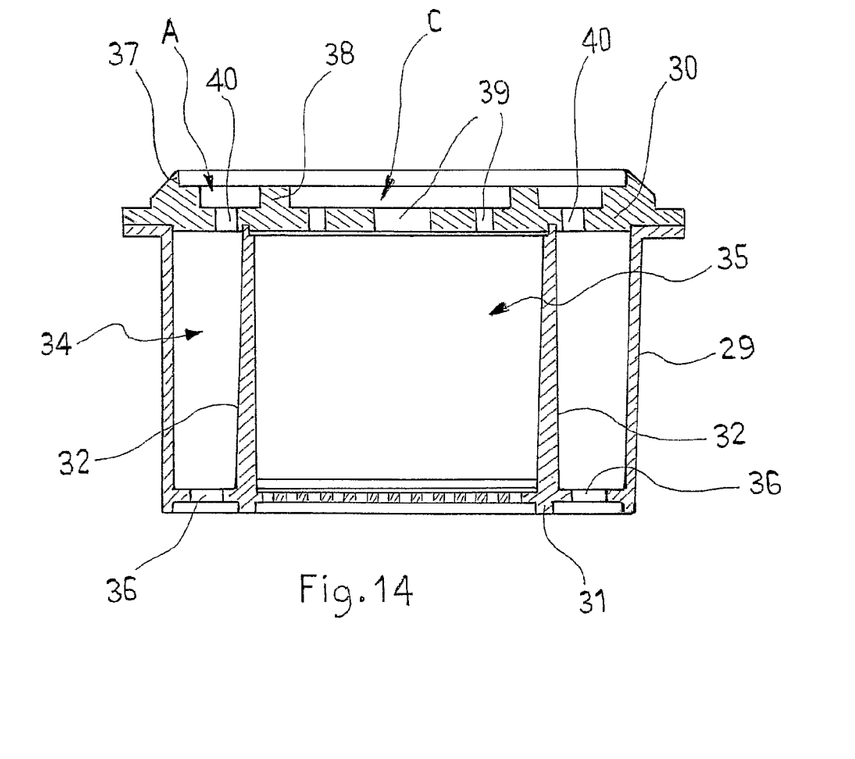
FIG. 14 is a sectional view of a two-chamber cartridge according to the invention.

The cartridge shown in FIGS. 5-10 does not have an internal wall separating the inner room into two chambers for two different ingredients, this is shown by FIG. 14, that is a schematic view of such a cartridge.

The cartridge shown in FIG. 14 has a lower part 29 and a closing lid 30. The bottom wall 31 of the cartridge is provided with a circular wall 32 internally located and extending from the bottom wall 31 to the top, or lid, 30 of the cartridge. The space within the cartridge is thus divided in two chambers: a central chamber 35 and a peripheral chamber 34; central chamber 35 is provided with a paper filter at the top and at its bottom, the bottom filter being optionally supported by a perforated disc (not shown).

Chamber 34 is shown to have outlet openings 36 for the beverage, that, e.g. will be operated in the same way as openings 23 in the previously disclosed embodiment. Chamber 35 has a perforated bottom, but the same bottom wall as in FIGS. 5-11 can advantageously be adopted.

The top 30 has a plurality of holes for selectively feeding water to chambers 34 and 35. More particularly the lid 30 has two ridges 37 and 38 that define a central area C from an annular area A; central area C is provided with holes 39 that provide a passage for water to chamber 35, while holes 40 of annular area A will feed water or steam to chamber 34. Reference 41 identifies the water feeding portion of the apparatus: two O-rings 44, 45 or other sealing means, will seal the two areas A and C when element 41 is pressed on the top 30 of the cartridge. Water or steam or both can thus be selectively fed through feeding ducts 42 and 43 to chambers 34 and 35.

It will be appreciated that the invention system is extremely flexible and makes it possible to use the collecting unit with traditional cartridges: in this case only one beverage will be dispensed through only one dispensing means or dispensing ducts 5, 7 or 8,9. the invention can therefore be quickly and efficiently be implemented on existing dispensing apparatuses.

The invention claimed is:

1. A beverage dispensing apparatus, comprising:
a water inlet;
a cartridge including at least two nested co-axial chambers which separate a plurality of beverage ingredients;
a beverage collecting unit configured to dispense a beverage from said cartridge; wherein
said beverage collecting unit includes at least two separate dispensers, including two or more separate and different sized dispensing ducts having separate inlets and outlets, each of said ducts is in fluid connection with a different singular one of the nested co-axial chambers of the cartridge to separately dispense the beverage ingredients from said cartridge into a beverage container.

2. The beverage dispensing apparatus according to claim 1, wherein said dispensers include two or more separate and different dispensing ducts.

3. The beverage dispensing apparatus according to claim 2, wherein said dispensing ducts define two or more separate and different paths along which a dispensed beverage ingredient flows from the cartridge to a cup or other beverage container.

4. The beverage dispensing apparatus according to claim 1, wherein said beverage collecting unit has two circular collecting chambers coaxially arranged one inside the other, each chamber having at least one outlet connected to one of said dispensers.

5. The beverage dispensing apparatus according to claim 4, wherein one of said dispensing ducts of the beverage collecting unit has a smaller diameter than the diameter of the other duct.

6. A method of dispensing a beverage from a beverage dispensing apparatus, comprising: providing said apparatus including a cartridge that has at least two nested co-axial chambers which separate a plurality of beverage ingredients and a beverage collecting unit to dispense a beverage from said cartridge to a beverage container; and dispensing said beverage ingredients separately from said cartridge to said container through said collecting unit that includes at least two separate dispensers including two or more separate and different sized dispensing ducts having separate inlets and outlets, and each of said ducts is in fluid connection with a different singular one of the nested co-axial chambers of the cartridge.

7. The method according to claim 6, wherein said cartridge contains at least two beverage ingredients and said beverage ingredients are dispensed at different times.

8. The method according to claim 6, wherein said cartridge contains at least two beverages and said beverages are dispensed at different times.

9. The method according to claim 6, wherein water is fed to said cartridge through at least one water/steam inlet.

10. A cartridge for a beverage dispensing apparatus, comprising: at least two separate nested co-axial chamber portions separated by a wall inside the cartridge that extends from a bottom of the cartridge to a top of the cartridge, the chamber portions of the cartridge contain different ingredients or beverages dispensable from the cartridge through two or more separate and different sized dispensing ducts, and each of the dispensing ducts is dedicated to one of the chamber portions to direct one of the ingredients or beverages into a beverage container separately from other ingredients or beverages dispensed from other ones of the co-axial chamber portions.

11. The cartridge according to claim 10, comprising a main centrally located dispensing opening and one or more secondary circumferentially located openings.

12. The cartridge according to claim 10 or 11, wherein said openings are open under the pressure of the beverage inside the cartridge.

13. The cartridge according to claim 11, further comprising a plurality of channels provided around said main centrally located dispensing opening.

14. A cartridge for a beverage dispensing apparatus, comprising: at least one outlet opening for a beverage, wherein said outlet opening is located peripherally to a bottom wall of a dual nested co-axial chamber formed in the cartridge, the dual nested co-axial chamber includes a peripheral chamber surrounding a central chamber, and said outlet opening is in fluid connection with only the peripheral chamber, the peripheral and central chambers of the cartridge dispense different ingredients or beverages from the cartridge through separate and different sized dispensing ducts, and each of the dispensing ducts is dedicated to one of the peripheral and central chambers to direct one of the ingredients or beverages into a beverage container separately from another one of the ingredients or beverages dispensed from the other one of the peripheral and central chambers.

15. The cartridge according to claim 14, comprising a plurality of said outlet openings located peripherally.

16. The cartridge according to claim 14 or 15, further comprising a centrally located opening.

* * * * *

UNITED STATES PATENT AND TRADEMARK OFFICE
CERTIFICATE OF CORRECTION

PATENT NO. : 8,833,240 B2  Page 1 of 1
APPLICATION NO. : 11/817514
DATED : September 16, 2014
INVENTOR(S) : Luca Doglioni Majer It is certified that error appears in the above-identified patent and that said Letters Patent is hereby corrected as shown below:

On the title page, Item (30) has been omitted. Item (30) should read:

-- (30)    Foreign Application Priority Data

Mar. 22, 2005   (EP) ..................... 05006240 --

Signed and Sealed this
Twenty-third Day of December, 2014

Michelle K. Lee
*Deputy Director of the United States Patent and Trademark Office*